United States Patent [19]

Trikha

[11] Patent Number: 4,721,273
[45] Date of Patent: Jan. 26, 1988

[54] LIFE-THREAT ASSESSMENT AND CONTROL COMMAND FOR AIRCREW ESCAPE SYSTEMS

[75] Inventor: Arun K. Trikha, Bellevue, Wash.

[73] Assignee: The Boeing Company, Seattle, Wash.

[21] Appl. No.: 894,785

[22] Filed: Aug. 8, 1986

[51] Int. Cl.⁴ .............................................. B64D 25/10
[52] U.S. Cl. ...................... 244/122 AE; 244/122 AB; 244/141
[58] Field of Search ........ 244/122 R, 122 A, 122 AB, 244/122 AC, 122 AD, 122 AE, 122 AF, 122 AH, 141, 140

[56] References Cited

U.S. PATENT DOCUMENTS

| | | | |
|---|---|---|---|
| 2,892,602 | 6/1959 | Servanty | 244/141 |
| 2,996,272 | 8/1961 | Stott et al. | 244/122 |
| 3,186,662 | 6/1965 | Martin | 244/122 |
| 3,191,892 | 6/1965 | Fuller et al. | 244/122 |
| 3,311,330 | 3/1967 | Hofferberth et al. | 244/141 |
| 3,530,868 | 9/1970 | Rickards | 137/38 |
| 3,862,731 | 1/1975 | McIntyre | 244/141 |
| 4,057,206 | 11/1977 | Duncan et al. | 244/147 |
| 4,216,928 | 8/1980 | Hooper et al. | 244/122 |
| 4,236,687 | 12/1980 | Stone et al. | 244/122 |
| 4,395,001 | 7/1983 | Stone et al. | 244/122 |
| 4,396,171 | 8/1983 | Schultz | 244/122 |
| 4,437,628 | 3/1984 | Schwatz | 244/122 |
| 4,448,374 | 5/1984 | Duncan | 244/150 |
| 4,505,444 | 3/1985 | Martin | 244/122 |
| 4,527,758 | 7/1985 | Ayoub et al. | 244/150 |
| 4,580,746 | 4/1986 | Peck | 244/122 AE |

Primary Examiner—Joseph F. Peters, Jr.
Assistant Examiner—Rodney Corl
Attorney, Agent, or Firm—Delbert J. Barnard

[57] ABSTRACT

A crewmember (12) is positioned within an ejection seat or other escape device (10). The escape device (10) is ejected from the aircraft or other flying vehicle when it is desired to effect an escape. At the start of ejection, the altitude, sink rate and roll angle of the escape device (10) are determined, by appropriate sensors (128, 132). A microprocessor (66) is used for dividing the altitude by the sink rate to obtain a first time value. The microprocessor (66) is used to divide the roll angle by a desired rate of roll angle correction, to obtain a second time value. The second time value is subtracted from the first time value to obtain a third time value, $t_c$. In response to $t_c$ being larger than a predetermined value, the microprocessor (66) controls separation to subject the crewmember (12) to a relatively low injury risk level. In response to $t_c$ being smaller than said predetermined time value, the microprocessor (66) controls separation to occur faster, attended by the crewmember (12) being subjected to a higher injury risk level.

21 Claims, 21 Drawing Figures

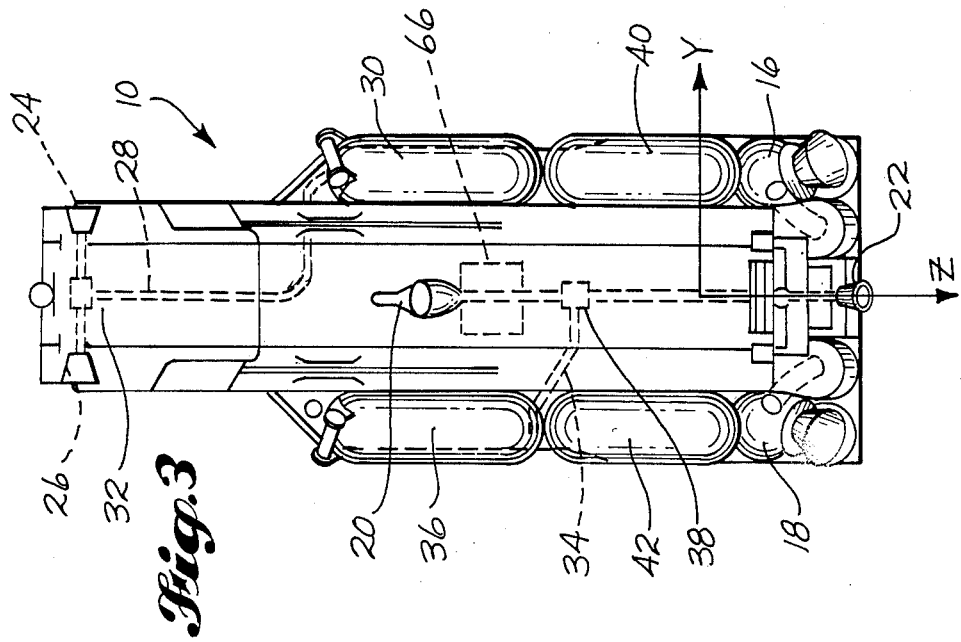
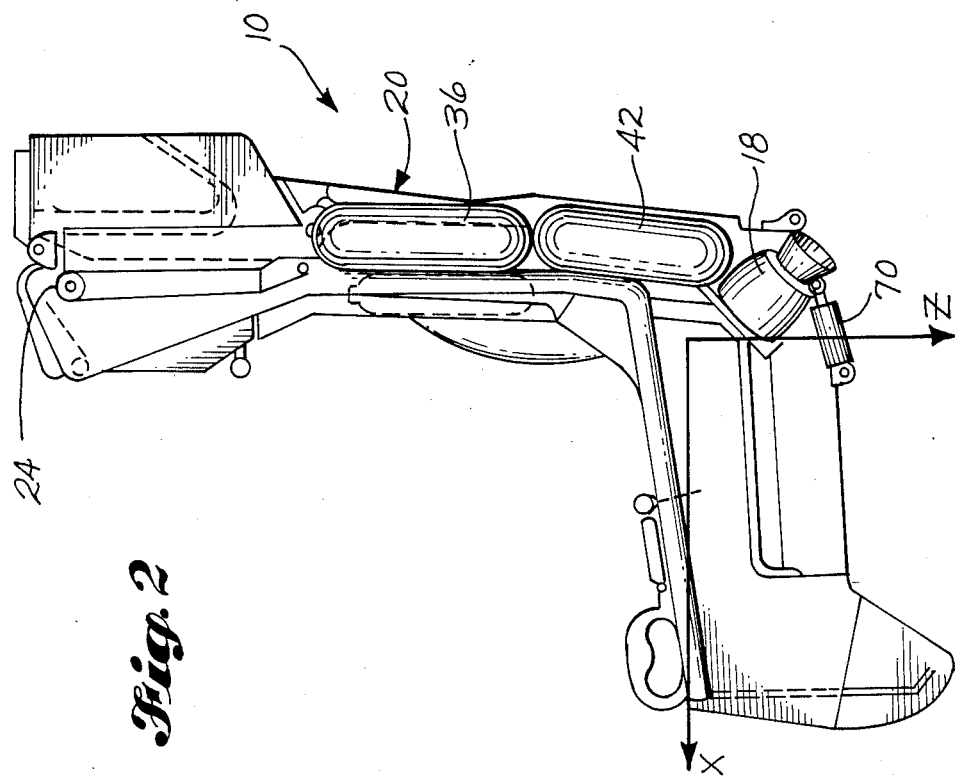

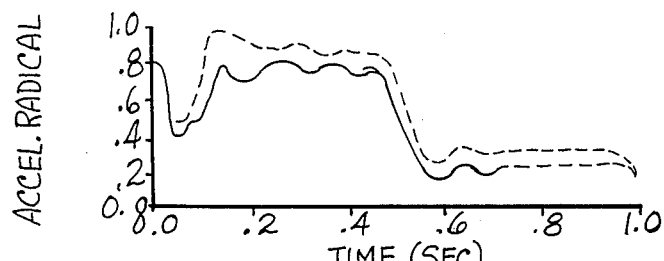
Fig.12 ACCELERATION RADICAL VERSUS TIME
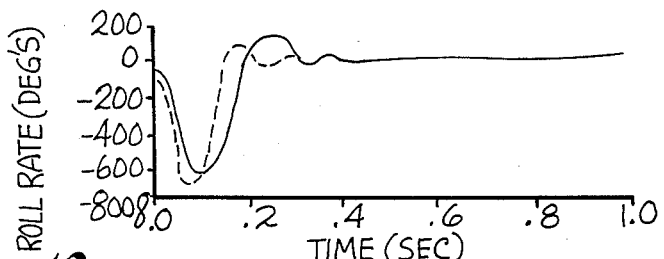
Fig.13 ROLL RATE VERSUS TIME
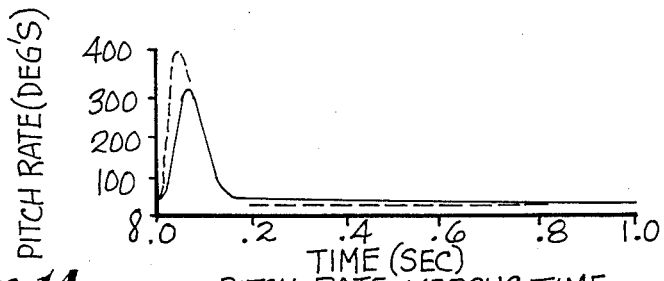
Fig.14 PITCH RATE VERSUS TIME
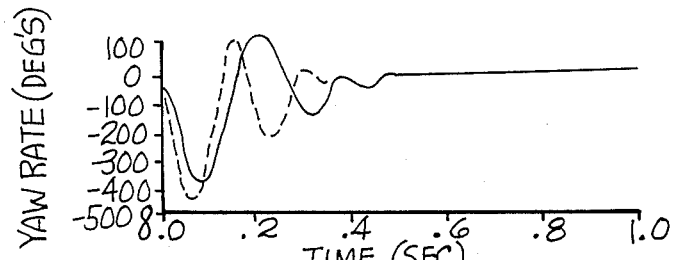
Fig.15 YAW RATE VERSUS TIME
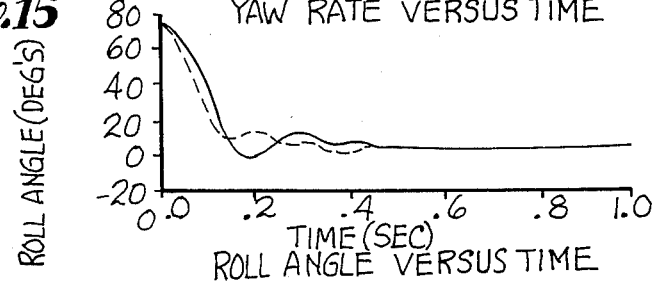
Fig.16 ROLL ANGLE VERSUS TIME

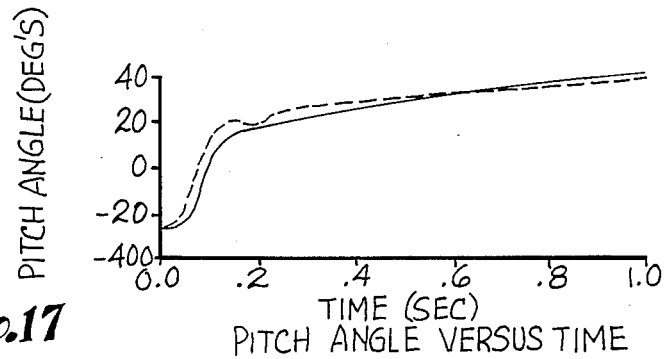
Fig.17 PITCH ANGLE VERSUS TIME
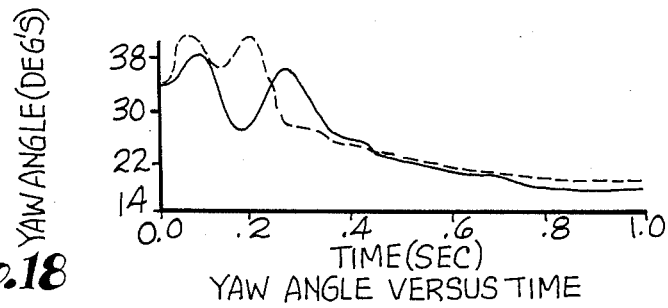
Fig.18 YAW ANGLE VERSUS TIME
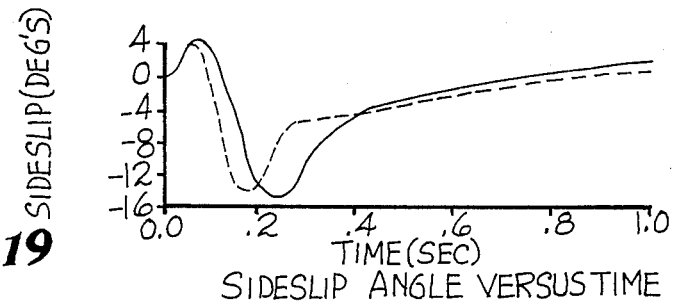
Fig.19 SIDESLIP ANGLE VERSUS TIME
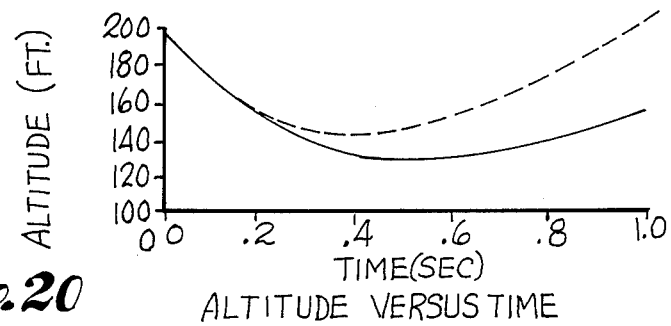
Fig.20 ALTITUDE VERSUS TIME

LIFE-THREAT ASSESSMENT AND CONTROL COMMAND FOR AIRCREW ESCAPE SYSTEMS

GOVERNMENT CONTRACT

The United States government has rights in this invention pursuant to Contract No. F33615-84-C-0518 awarded to The Boeing Military Airplane Company by the United States Air Force.

TECHNICAL FIELD

This invention relates to aircrew escape from a disabled aircraft or other flying vehicle. More particularly, it relates to an escape method and system adapted to: maximize the probability of crewmember survival for all design escape conditions, including escape conditions at low altitudes, high sink rate, and adverse attitude, and minimize the probability of crewmember injury, except when some injury risk is necessary for crewmember survival.

BACKGROUND ART

The method and system of this invention were developed for use in an aircraft as a control for an ejection seat. However, the invention is not limited to aircraft but also has application to aerospace planes and space vehicles. Also, the method and system of the invention have been applied in design studies to aircraft escape capsules. Accordingly, the term "flying vehicle" is used herein to mean either an aircraft or an aerospace craft or a space craft and the term "escape device" is used to mean any type of crewmember carrying device which is separated from the vehicle as a part of a crewmember escape operation.

Generally, a crewmember escape operation for an ejection seat is as follows:

An escape path is cleared, such as by the opening or removal of a canopy, escape hatch, or other barrier on the vehicle, in the escape path of the escape device. Then, the escape device is separated (e.g. ejected or catapulted) from the vehicle. If at the time of separation the escape device is in an upright position, the escape device is ejected vertically upwardly. If the escape device is at that time high enough above the ground for safe deployment of a parachute, a parachute may be opened and used for lowering the crewmember to the ground. However, usually the escape device is flown to a higher altitude to avoid collision with the vehicle and then the parachute is opened. If at the time of separation the escape device is in a leaning attitude, or is upside down, and more elevation is needed, the escape device is rotated into an upright position while being flown to a higher altitude.

U.S. Pat. No. 3,191,892, granted June 29, 1965, to Harold R. Fuller and James L. Greene, Jr., discloses an ejection system which functions to catapult the seat and crewman out of the aircraft, and then immediately open a parachute, for bringing the crewmember safely to the ground. U.S. Pat. No. 3,186,662, granted June 1, 1985, to James Martin, and U.S. Pat. No. 4,216,928, granted Aug. 12, 1980, to John O. Hooper, W. James Stone and Vernon D. Burklund, both disclose an ejection seat system in which the seat is provided with thruster means for flying the seat following its separation from the aircraft. In U.S. Pat. No. 4,216,928, the patentees state that their system capability is such that a low altitude, inverted ejection results in a reverse in seat direction after initially clearing the aircraft so that the pilot will not impact with the earth but rather will be moved upwardly to an altitude at which his parachute can be safely deployed. FIG. 5 of this patent graphically illustrates a low altitude, inverted ejection.

U.S. Pat. No. 4,236,687, granted Dec. 2, 1980, to W. James Stone and Lovic P. Thomas, also discloses an ejection seat having a thruster for flying the seat following seat separation from the aircraft. The thruster includes a gimbaled nozzle and a control system for moving the nozzle, to provide pitch, roll and yaw control of the ejection seat.

U.S. Pat. No. 4,437,628, granted Mar. 20, 1984, to Marcus Schwartz discloses a torso haul back system for an ejection seat. This patent also makes reference to an explosive bolt system for jettisoning the cockpit canopy of an aircraft.

Examples of other ejection seat systems in the patent literature are disclosed by the following U.S. patent : U.S. Pat. No. 2,892,602, granted June 30, 1959, to Lucien Servanty; U.S. Pat. No. 2,996,272, granted Aug. 15, 1961, to Albert M. Stott and Norman J. Waecker; U.S. Pat. No. 3,311,330, granted Mar. 28, 1967, to James E. Hofferberth and John B. Morris; U.S. Pat. No. 3,530,868, granted Sept. 29, 1970, to Michael A. Rickards; U.S. Pat. No. 3,862,731, granted Jan. 28, 1975, to Robert G. McIntyre; U.S. Pat. No. 4,057,206, granted Nov. 8, 1977, to James W. Duncan and Walter R. Peck; U.S. Pat. No. 4,395,001, granted July 26, 1983, to W. James Stone, Vernon D. Berklund and Robert B. Dillinger; U.S. Pat. No. 4,396,171, granted Aug. 2, 1983, to Edwin R. Schultz; U.S. Pat. No. 4,448,374, granted May 15, 1984, to James W. Duncan; U.S. Pat. No. 4,505,444, granted Mar. 19, 1985, to John S. Martin; and U.S. Pat. No. 4,527,758, granted July 9, 1985, to Peter Ayoub and Alan Cantor. All of the above patents, and the prior art discussed and/or cited in the patents, should be considered for the purpose of putting the present invention into proper perspective relative to the prior art.

DISCLOSURE OF THE INVENTION

As previously stated, the method and system of this invention were developed for use in an aircraft as a control for an ejection seat, as a part of design effort by The Boeing Military Aircraft Company for the United States Air Force. Control aspects of the project, relating to the invention, are discussed in the following papers:

Trikha, A. K., "Sensor Selection For The Boeing CREST Ejection Seat Design" Proceedings, 23rd Annual SAFE Symposium, December 1985; and Trikha, A. K. and Duffy, K. S., "Boeing Control Law For CREST Demonstration Ejection Seat" Proceedings, 23rd Annual SAFE Symposium, December 1985. The control law in the latter paper provides a basis for my co-pending application, Ser. No. 877,220, filed June 23, 1986, and entitled "Adaptive Control System For Crew Escape Devices."

The present invention relates to a control of the ejection of an escape device and also a control of the flying of the escape device following separation.

It is a principal object of the present invention to provide a method and system of quickly assessing the seriousness of a life-threatening situation, and, if a life-threatening situation exists, controlling the escape procedure, to provide a faster escape.

Whenever possible, ejection should not be initiated until after the canopy or other barrier has been completely moved from the escape path and the crewmember has been hauled back into a restrained position by a haul back system. Also, during both ejection and flying of the escape device, the acceleration levels to which the crewmember is subjected should be kept low to minimize the risk of injury to the crewmember.

In accordance with the present invention, the acceleration levels to which the crewmember is subjected are controlled, both during ejection and post ejection flying, to keep them low for the purpose of avoiding injuries to the crewmember, whenever doing so does not threaten the crewmember's life. In accordance with the invention, however, provision is made to take some risk of injury if it is necessary to crewmember survival.

The various ejection conditions for an ejection seat (or other escape device) may be different from each other in pressure altitude, altitude above ground, air speed, pitch angle, roll angle, side slip angle, pitch rate, roll rate, yaw rate, sink rate, aircraft (or other vehicle) acceleration, propellant temperature, crewmember weight, and survival kit weight. Thus, in general, the degree of life threat for one ejection condition may be different from that in another condition because of a difference in any of the above fourteen variables. The problem is to reduce the number of variables which must be considered to quantify the degree of life threat associated with an ejection condition, so that the life assessment can be made and commands given within a relatively small amount of time.

A detailed consideration of the various alternatives available for quantifying the life-threat assessment showed that a good measure of the degree of the life threat is the critical time $t_c$, which is defined as follows:

$$t_c = \frac{h_g}{v_s} - \frac{\phi}{K}$$

Where:
$h_g$ = seat altitude above ground, ft
$v$ = seat sink rate, ft/sec
$\phi$ = seat roll angle, deg
$K$ = average expected value of roll rate during roll angle correction, deg/sec. It is typically equal to 360 deg/sec.

The critical time $t_c$ is thus approximately equal to that time available for providing upward thrust to the seat before it will hit the ground, if it continued to descend at the current sink rate. For a seat roll angle equal to zero, the critical time $t_c$ is equal to the time at which the seat would hit the ground, if it continued to descend at the current sink rate. For seat roll angles other than zero, the critical time $t_c$ is decreased by an amount proportional to the absolute value of the roll angle. This decrease in $t_c$ is required to compensate for the time loss in rolling the seat to an attitude where the propulsive thrust can be used more effectively.

It was found that a $t_c$ value of about 0.3 or less represents a high degree of life threat for the particular seat design being investigated. Higher values of $t_c$ correspond to lower degrees of life threat.

The ejection seat of the investigated system has a continuously operating strap-down inertial sensor unit (ISU) and an aircraft-mounted radar altimeter. The ISU functions to provide values of the seat sink rate and seat roll angle at all times. These data are available at ejection initiation and every ten ms (controller frame time) thereafter. The aircraft-mounted radar altimeter transmitter is planned to be used only after ejection initiation. State-of-the-art altimeters can provide the "altitude above the ground" information within 6-7 ms. The system seat controller will, therefore, have all of the data required for life-threat assessment at 10 ms after ejection initiation. The life-threat assessment is performed during the next 10 ms, so that appropriate control commands can be issued within 20 ms after ejection initiation.

In accordance with the invention, a life-threat determination $t_c$ is made upon initiation of an escape. If $t_c$ is larger than a predetermined time value, the microprocessor controls the escape in a manner subjecting the crewmember to a relatively low injury risk. In response to $t_c$ being smaller than said predetermined time value, the microprocessor controls the escape to occur faster, attended by the crewmember being subjected to a higher injury risk level. The expression "controlling the escape to subject the crewmember to a relatively low injury risk level" is used herein to mean controlling any one, some or all phases of the escape, in a manner resulting in a relatively low risk of injury to the crewmember attributable to the controlled phase or phases of escape. The phases of escape include (a) removal of a barrier in the escape path, (b) the haul back of the crewmember into a restrained position, (c) the ejection of the escape device and crewmember from the vehicle, (d) the rolling of the escape device into a proper attitude, and (e) the flying of the escape device upwardly to a higher altitude.

In preferred form, the life-threat assessment logic delivers control commands which vary with the value of $t_c$. That is, the variance in the control command is gradual and continuous. The control command will operate to reduce the risk of injury more and more with an increasing value of $t_c$.

In accordance with an aspect of the invention, if $t_c$ is larger than a predetermined time value, the initiation of the ejection means is delayed until after the barrier has been removed from the escape path. However, if $t_c$ is smaller than said predetermined value, the ejection means is initiated at a calculated time interval after the ejection handle is pulled, before the barrier is removed, but while the means for removing the barrier is functioning.

In accordance with another aspect of the invention, if $t_c$ is larger than the predetermined value, a relatively low level haul back force is applied to a torso haul back means used for moving the crewmember into restrained contact with the escape device. However, if $t_c$ is smaller than a predetermined value, a larger haul back force is applied, to speed up the haul back procedure.

In accordance with a further aspect of the invention, if $t_c$ is larger than the predetermined time value, the ejection means is controlled to limit the acceleration of the crewmember during ejection to a level minimizing injury risk of the crewmember. However, if $t_c$ is smaller than the predetermined value, a faster ejection is performed, attended by an increase in the acceleration level and an increase in the injury risk to the crewmember.

In accordance with yet another aspect of the invention, if $t_c$ is larger than a predetermined value, following separation the escape device is controlled to move at a rate of acceleration which will subject the crewmember to a relatively low risk of injury. However, in response to $t_c$ being smaller than the predetermined time value, the escape device is positioned at a faster rate, attended by an increase in the rate of acceleration of the crewmember and thus an increase in the risk of injury to the crewmember.

Other more limited aspects of the invention are hereinafter described as a part of the description of the best mode of the invention.

BRIEF DESCRIPTION OF THE DRAWING

Like reference numerals are used to designate like parts throughout the several views of the drawing, and:

FIG. 2 is a side elevational view of the ejection seat shown by FIG. 1, minus the crewmember;

FIG. 3 is a rear elevational view of the ejection seat shown in FIGS. 1 and 2, also minus the crewmember;

FIG. 8 is a schematic block diagram showing control logic for controlling the attitude of the ejection seat;

FIG. 12 is a plot of ejection seat acceleration versus time, wherein the dashed and solid lines indicate, respectively, first and ninety-ninth percentile crewmembers ejected from an F16 aircraft cockpit for the following flight conditions: 300 KEAS (Knots equivalent air speed), 30° dive angle, 90° roll angle, and 70° F. propellant temperature;

FIG. 13 is a plot like FIG. 12, but showing ejection seat roll rate versus time;

FIG. 14 is a plot like FIGS. 12-13, but showing ejection seat pitch rate versus time;

FIG. 15 is a plot like FIGS. 12-14, but showing ejection seat yaw rate versus time;

FIG. 16 is a plot like FIGS. 12-15, but showing ejection seat roll angle versus time;

FIG. 17 is a plot like FIGS. 12-16, but showing ejection seat pitch angle versus time:

FIG. 18 is a plot like FIGS. 12-17, but showing ejection seat yaw angle versus time;

FIG. 19 is a plot like FIGS. 12-18, but showing ejection seat side slip angle versus time;

FIG. 20 is a plot like FIGS. 12-19, but showing ejection seat altitude versus time.

BEST MODE FOR CARRYING OUT THE INVENTION

By way of typical and therefore nonlimitative example, an ejection seat type escape device and its control system are illustrated. However, for descriptive purposes, the ejection seat will herein be termed "an escape device," because the invention is not limited to the control of an ejection seat.

Figure 1:
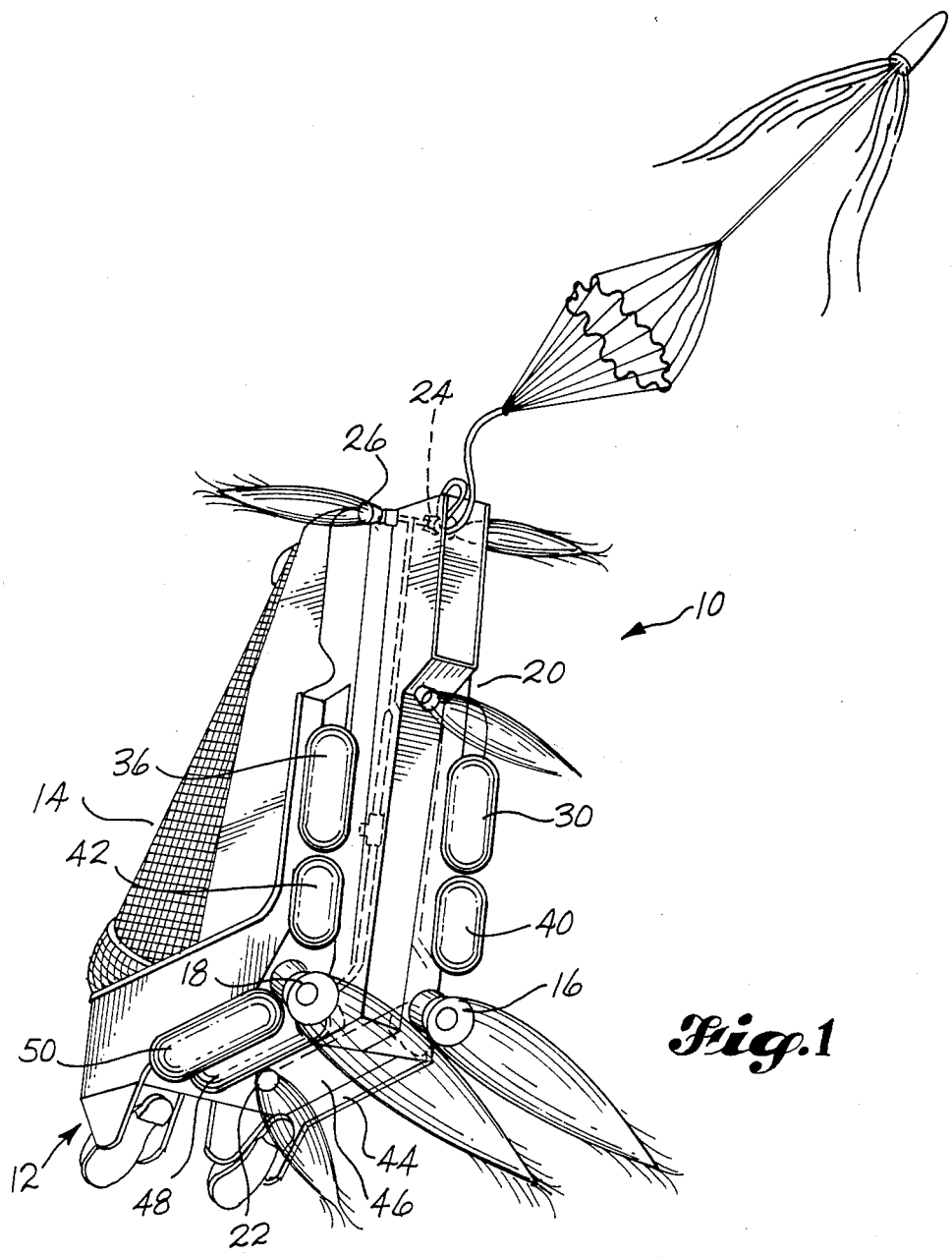
FIG. 1 is a pictorial view of an ejection seat type escape device, looking from below and toward the bottom, one side and the rear of the device while it is in the process of flying, following separation from an aircraft.

The escape device 10 comprises a position for a crewmember 12. Preferably, the escape device 10 includes a system for restraining movement of the crewmember during ejection. A wind blast protector portion of this system is shown in FIG. 1, and is designated 14. A more complete disclosure of such a system 14 can be found in U.S. Pat. No. 4,592,523, granted June 3, 1986, to Gerald F. Herndon, and in allowed U.S. application Ser. No. 656,039, filed Sept. 28, 1984, by Gerald F. Herndon.

Escape device 10 includes thruster means used for flying it, following separation of escape device 10 from an aircraft (not shown). The thruster means comprise a pair of main thrusters 16, 18, a pair of pitch control thrusters normally termed reaction jets 20, 22 and a pair of yaw/roll control thrusters or reaction jets 24, 26.

Figure 4:
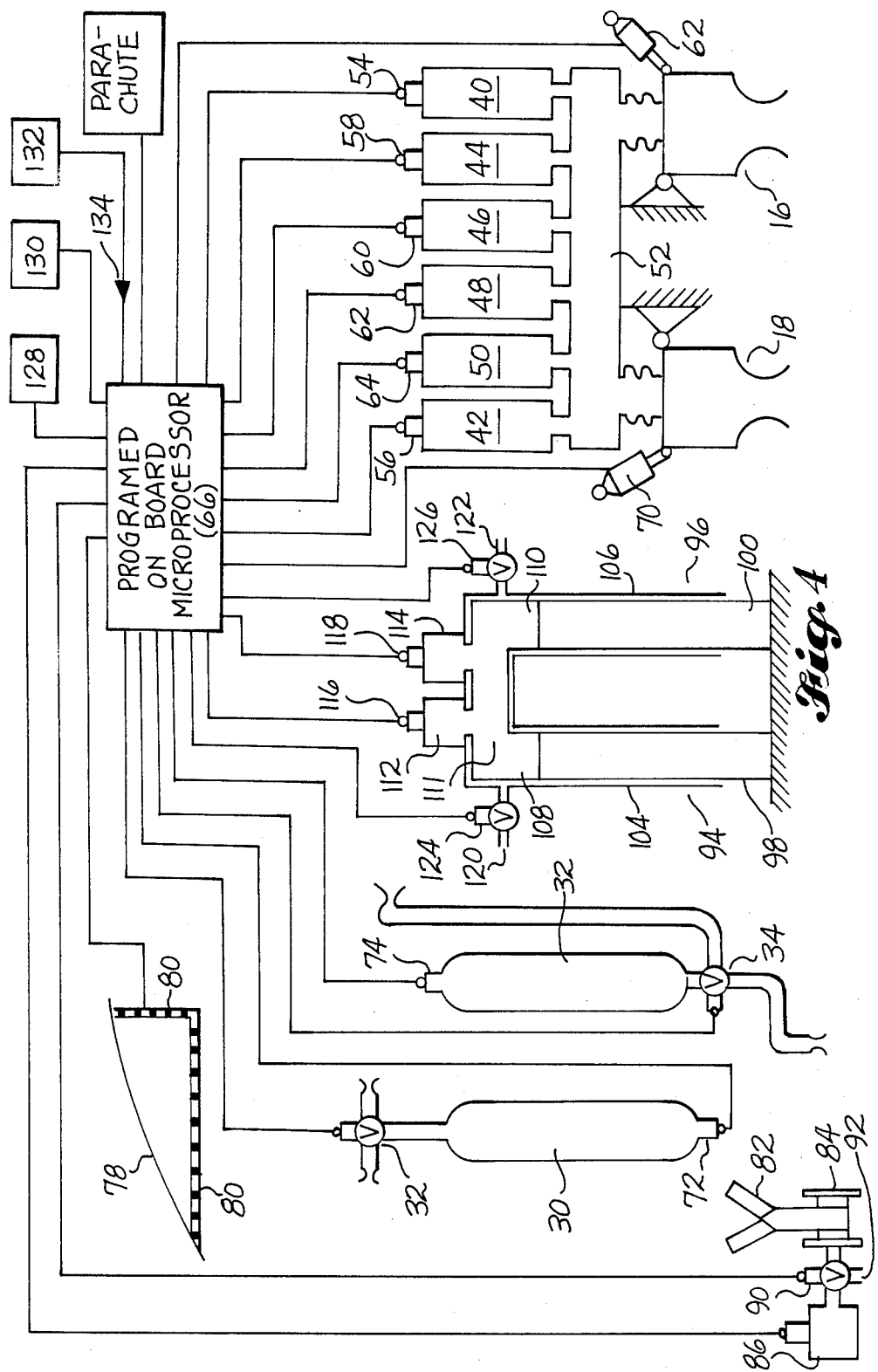
FIG. 4 is a schematic diagram of components of an ejection seat system.

As best shown in FIGS. 3 and 4, the reaction jets 24, 26 are connected by a manifold 28 to a gas generator 30. A flow divider valve 32 is provided in the manifold 28, between the reaction jets 24, 26. In similar fashion, the reaction jets 20, 22 are connected by a flow divider valve 38 and a manifold 34 to a gas generator 36.

A plurality of gas generators 40, 42, 44, 46, 48, 50 are provided as a source of propulsion gases for the main thrusters 16, 18. These reaction chambers 40, 42, 44, 46, 48, 50 are hereinafter sometimes referred to as "bit motors." This is because in the illustrated system the magnitude of the propulsive force is controlled by a number of gas generators, or "bit motors," which are connected into the system. As shown by FIG. 4, the bit motors 40, 42, 44, 46, 48, 50 are all connected to a manifold 52 and the manifold 52 is connected to the main thrusters 16, 18. As also shown by FIG. 4, the bit motors 40, 42, 44, 46, 48, 50 are each provided with igniter devices 54, 56, 58, 60, 62, 64 which are connected to receive independent commands from a microprocessor 66.

The main thrusters 16, 18 are omni-axial thrusters. They are each mounted for movement, for the purpose of changing the direction of the thrust axis. The thrusters 16, 18 are schematically shown, in FIG. 4, to include control actuators 68, 70 which are also connected to receive command signals from the microprocessor. Only a single actuator is shown associated with each main thruster 16, 18. However, in an actual system at least two actuators would be used with each main thruster 16, 18. Omni-axial main thrusters, and servo systems for controlling them, are known in the prior art. An example is disclosed by the aforementioned U.S. Pat. No. 4,236,687.

As shown by FIG. 4, gas generators 30, 32 are provided with igniters 72, 74 which are connected to receive command signals from the microprocessor 66. The flow divider valves 32, 34 are also connected to receive command signals from the microprocessor 66.

A barrier or closure is in the escape path of the escape device 10 and crewmember 12 up until shortly before operation of the system to effect an escape. In an aircraft, the barrier is typically a canopy 78. As is well known, the canopy 78 may be held in place by explosive bolts, some of which are designated 80 in FIG. 4. The explosive bolts 80 are connected to receive command signals from the microprocessor 66.

The system includes a haul back harness 82 and means 84 for applying a haul back force to the harness 82, for pulling the crewmember 12 back tight against the back of his seat, prior to ejection. In FIG. 4, a gas generator 86, for controlling a haul back force applying means 89 (e.g. a reel), is shown connected to receive a command signal from the microprocessor 66. A conduit 88 is shown for delivering high energy gases from the gas generator 86 to the haul back device 84. Conduit 88 is shown to include a flow divider type vavle 90, for controlling the division of the flow of gases between the haul back device 84, and a dump path 92. Valve 90 is shown to be connected to receive a command signal from the microprocessor 66.

The system is further shown to include a two-part catapult. The catapult parts 94, 96 include inner pistons 98, 100 which are at one end attached to the aircraft 102, and tubes 104, 106. The tubes 104, 106 are connected to the escape device 10. Expansion chambers 108, 110 are formed between the fixed pistons 98, 100 and the closed ends of the tubes 104, 106. The expansion chambers 108, 110 communicate with a gas generation chamber 111 which includes a pair of propellant grains 112, 114, each having an ignition device 116, 118. The ignition devices 116, 118 are connected to receive independent control signals from the microprocessor 66. The gas generator chamber may include dump passageways 120, 122, controlled by dump valves 124, 126, to serve as a control for the ejection force. The dump valves 124, 126 are shown in FIG. 4 to be connected for receiving independent command signals from the microprocessor 66.

In accordance with the invention, the microprocessor 66 is incorporated into the escape device 10. For example, in an ejection seat type device 10, the microprocessor 66 may be incorporated within the back wall of the seat as shown by FIG. 3.

Control of the escape system is based on inputs from an inertial measurement unit or sensor 128, air data sensors 130 and a radar altimeter 132. Sensors 128, 130 may be located on the escape device 10. The radar altimeter 132 is carried by the aircraft and is connected to the microprocessor 66 by an umbilical cord 134.

In order to produce command signals for controlling the movement and orientation of the escape device 10, the microprocessor 66 must be furnished with information or data relating to a number of conditions. Specific conditions which must be either sensed or known, are as follows: (a) seat acceleration in three axes; (b) seat angular rates in three axes; (c) pitch and roll orientation or attitude of the seat; (d) seat sink rate, i.e. the rate at which the seat approaches the ground; (e) seat altitude above the ground; (f) seat angle of attack and side slip angle; (g) dynamic and static air pressure; (h) repellent temperature; and (i) seat and crewman weight estimate.

The operation of the various sensors that are used are matters which would be familiar to a person skilled in the art. A background to the selection of the sensors is set forth in the aforementioned paper: Trikha, A. K., "Sensor Selection For The Boeing CREST Ejection Seat Design" Proceedings, 23rd SAFE Symposium, December 1985. The means by which the microprocessor commands operation of the escape system is, in preferred form, embodied in a software control program stored in the microprocessor 66.

The software requirements or logic circuit will now be described.

Figure 5:
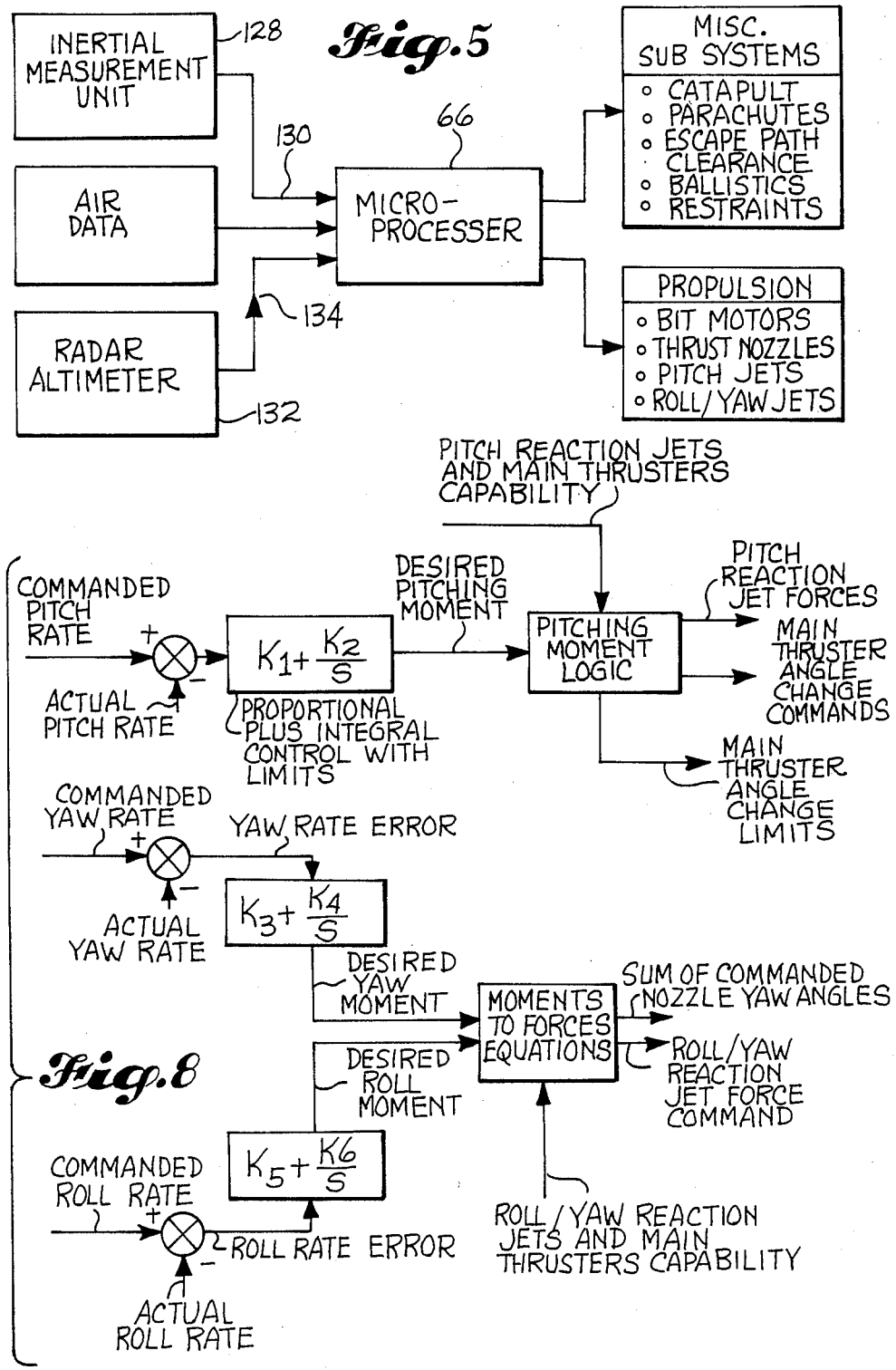
FIG. 5 is a schematic block diagram of primary components of the ejection seat system.

FIG. 5 shows the three sensors 128, 130, 132 which collect data and deliver it to the microprocessor 66. This figure shows that the microprocessor 66 delivers command signals to the bit motors for the main thrusters, to the mechanism for orienting the main thrusters, and to the gas generators and control valves which are associated with the pitch reaction jets and the roll/yaw reaction jets. It further shows that the microprocessor 66 sends command signals to the catapult, to the restraint systems and to the system for removing the canopy from the escape path.

Figure 6:
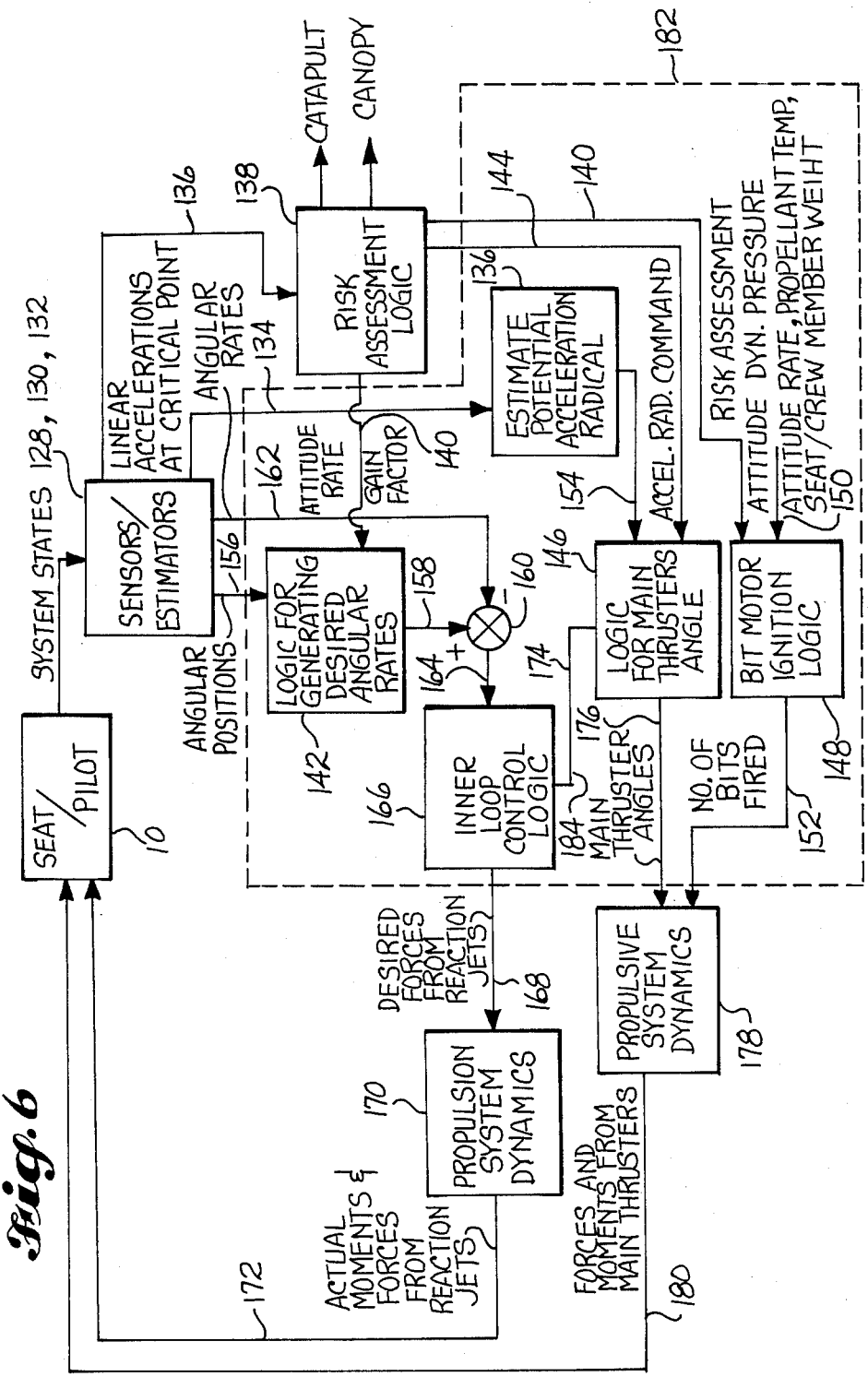
FIG. 6 is a schematic block diagram of the ejection seat system, including control logic.

FIG. 6 is a control logic diagram representing the control functions performed following ejection. In this figure, the escape device 10 is shown as a block diagram. The three sensors 128, 130, 132 are also shown as a block diagram. During flight of the escape device 10 following ejection, these sensors 128, 130, 132 output the actual linear accelerations of the escape device, and deliver information 134 to logic 136. These sensors 128, 130, 132 also output information relating to seat altitude, sink rate and attitude to risk assessment logic 138. As will hereinafter be discussed, the risk assessment logic 138 makes several adjustments to the overall system in response to a determination that a life-threat condition exists, for the purpose of performing certain functions a little faster even though doing so subjects the crewmember 12 to an increased risk of injury.

As diagramed, the risk assessment logic sends a command signal 140 to logic 142 which commands changes in angular movement and the rate of angular movement. Risk assessment logic 138 also sends a command signal 144 to the logic 146 which controls the angle of discharge of the main thrusters 16, 18. Risk assessment logic 138 sends a command 140 to the bit motor ignition logic 148. The risk assessment logic and its other functions are hereinafter described in greater detail.

Both desired and actual acceleration values are considered in terms of acceleration radicals which are directly related to acceleration. The equation for the acceleration radical for actual acceleration is set forth below:

$$a_{rad} = \left[ \left( \frac{a_x}{a_{x,\,lim}} \right)^2 + \left( \frac{a_y}{a_{y,\,lim}} \right)^2 + \left( \frac{a_z}{a_{z,\,lim}} \right)^2 \right]^{\frac{1}{2}}$$

Whereas $a_x$, $a_y$, and $a_z$ are measured actual linear accelerations as produced by sensors in each directional axis. $a_{x,\,lim}$, $a_{y,\,lim}$, and $a_{z,\,lim}$ are the limits of acceleration in each axis that can be sustained by a pilot or crew member. By way of example, the directional axes x, y, and z for the escape device 10 are show in FIGS. 2 and 3.

In preferred form, the risk assessment logic 138 will command a desired acceleration radical in a range from 0.5 to 0.95, with the lower and upper ends of the range presenting low and high risks, respectively. In some situations, this range may be modified by a factor of 60% depending on the seat attitude. In effect, this means that the commanded acceleration radical may range from 0.3 to 0.95. The highest acceleration radical is commanded when it is necessary to minimize the survival altitude required for safe ejection from the aircraft. When survival altitude is not a factor, i.e. in high altitude ejection situations, then the lowest acceleration radical is commanded.

The ignition logic 148 utilizes the risk assessment command 140, in combination with the altitude of the seat, the attitude and angular rates, the dynamic pressure, the propellant temperature and the seat/crewmember weight, all designated 150, to determine the number and order of bit motors 40, 42, 44, 46, 48, 50 which are to be fired and manifolded to the main thrusters 16, 18. This selection of the number of bit motors to be fired is indicated at 152 in FIG. 6. As should be understood, the number of bit motors which are fired determines the level of gas pressure existing in the manifold 52 which feeds the main thrusters 16, 18. Gas generators 30, 32 are always fired.

The linear acceleration signal 134 is used by logic 136 to calculate or estimate the actual acceleration radical pursuant to the above equation. The estimated acceleration radical is output at 154 and is received by control logic 146 which adjusts the angles of the main thrusters 16, 18.

The attitude or angular position output 156 of the sensors 128, 130, 132 is received by control logic 142 which generates desired angular rates for the escape device 10. The risk assessment logic 138 also outputs an attitude rate gain factor 140 which causes the change in seat attitude or angular rates to be high or low depending on the assessed life-threat risk, in much the same manner as the variation in commanded acceleration radical. The desired angular rates needed to correct seat attitude are output at 158. These rates are compared at 160 with the actual angular rates output at 162. The difference, indicated at 164 in FIG. 6 becomes a command to inner loop controller 166. Inner loop control logic 166 outputs a force command 168 for the various reaction jets 20, 22, 24, 26. This commands appropriate corrective forces and moments from the clusters 20, 22, 24, 26, as indicated at 170, 172, respectively. Further, the inner loop control logic 166 outputs main thruster angle commands 174. This command is received by the main thrusters angle logic 146 and is used to output a signal 176, functioning to slew the main thruster nozzle angles as may be necessary for the purpose of aiding the corrective forces and the moments provided by the reaction jets.

The control logic 146 outputs control signals which change the thrust angle for each main thruster 16, 18, in accordance with the inputs 144, 154, 174 received by this logic 146. The commanded thruster angles 176, and the commanded number of bits to be fired 152, are implemented as shown at 178 to produce desired forces and moments from the main thrusters 16, 18. These forces and moments operate on the escape device 10 as schematically indicated at 180.

Figure 7:
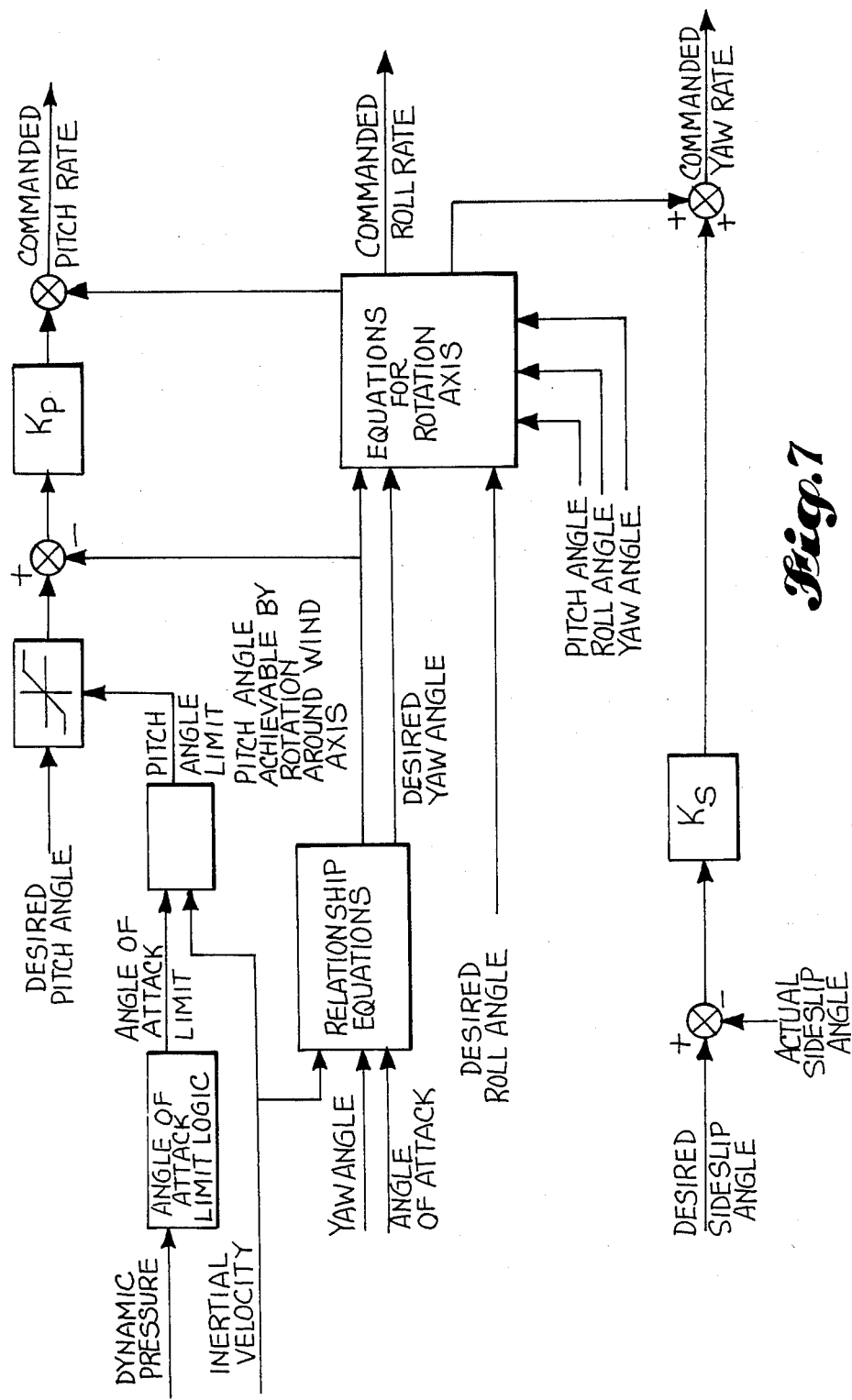
FIG. 7 is a schematic block diagram of control logic for commanding angular rates of movement of the ejection seat.
Figure 9:
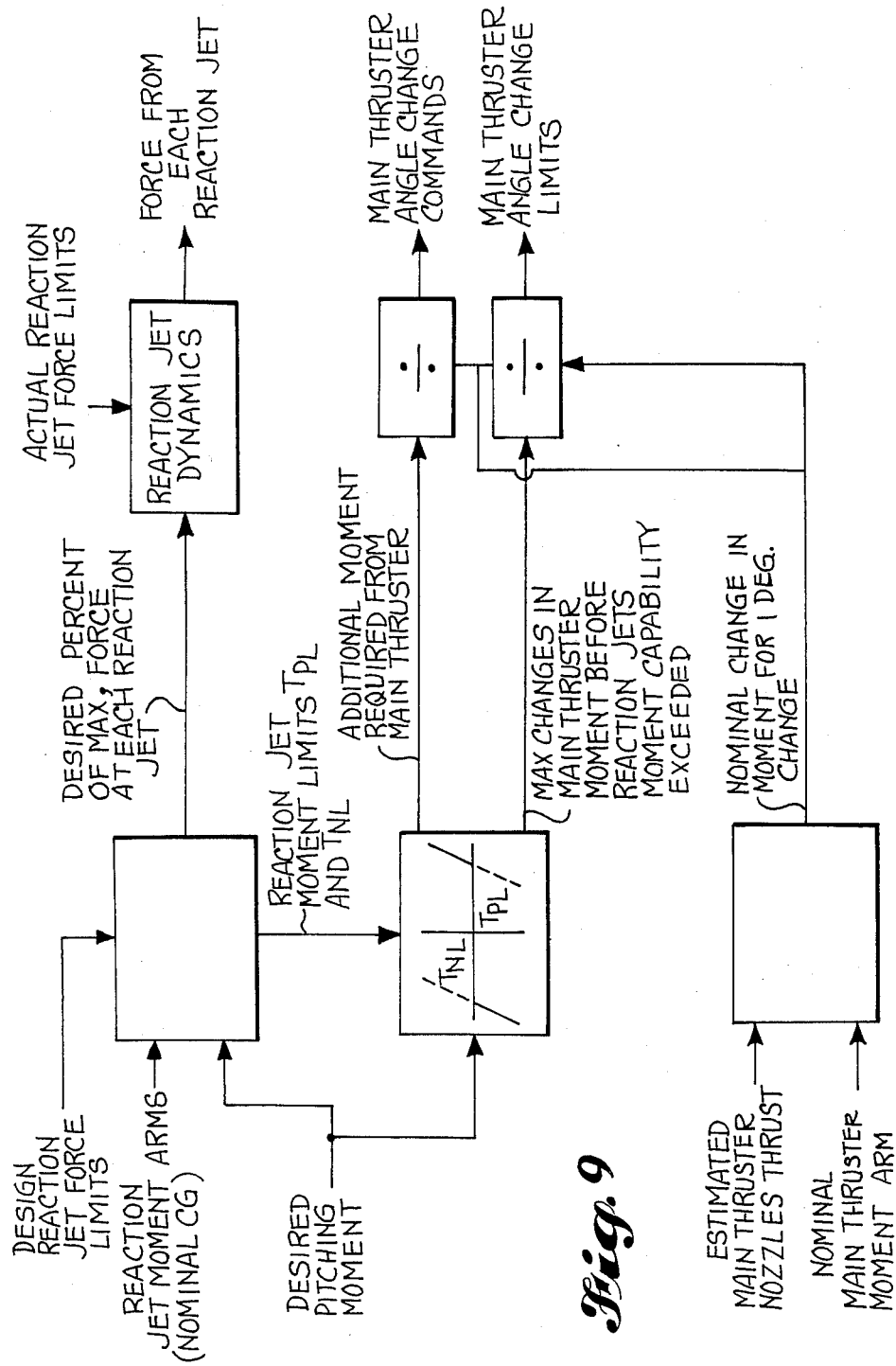
FIG. 9 is a schematic block diagram showing control logic for controlling the pitching moment of the ejection seat.
Figure 10:
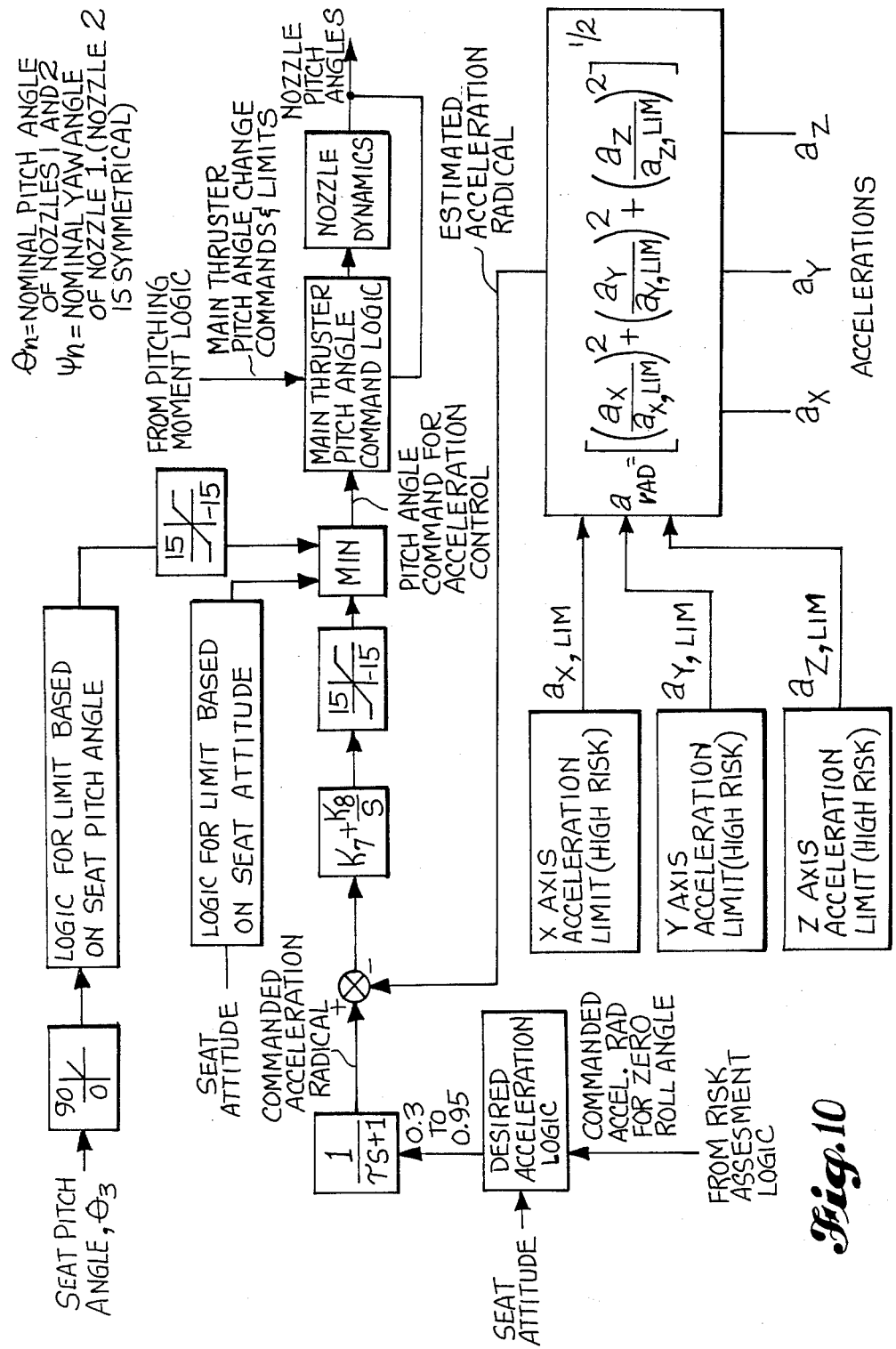
FIG. 10 is a schematic block diagram showing control logic for commanding pitch angles for the main thrusters.
Figure 11:
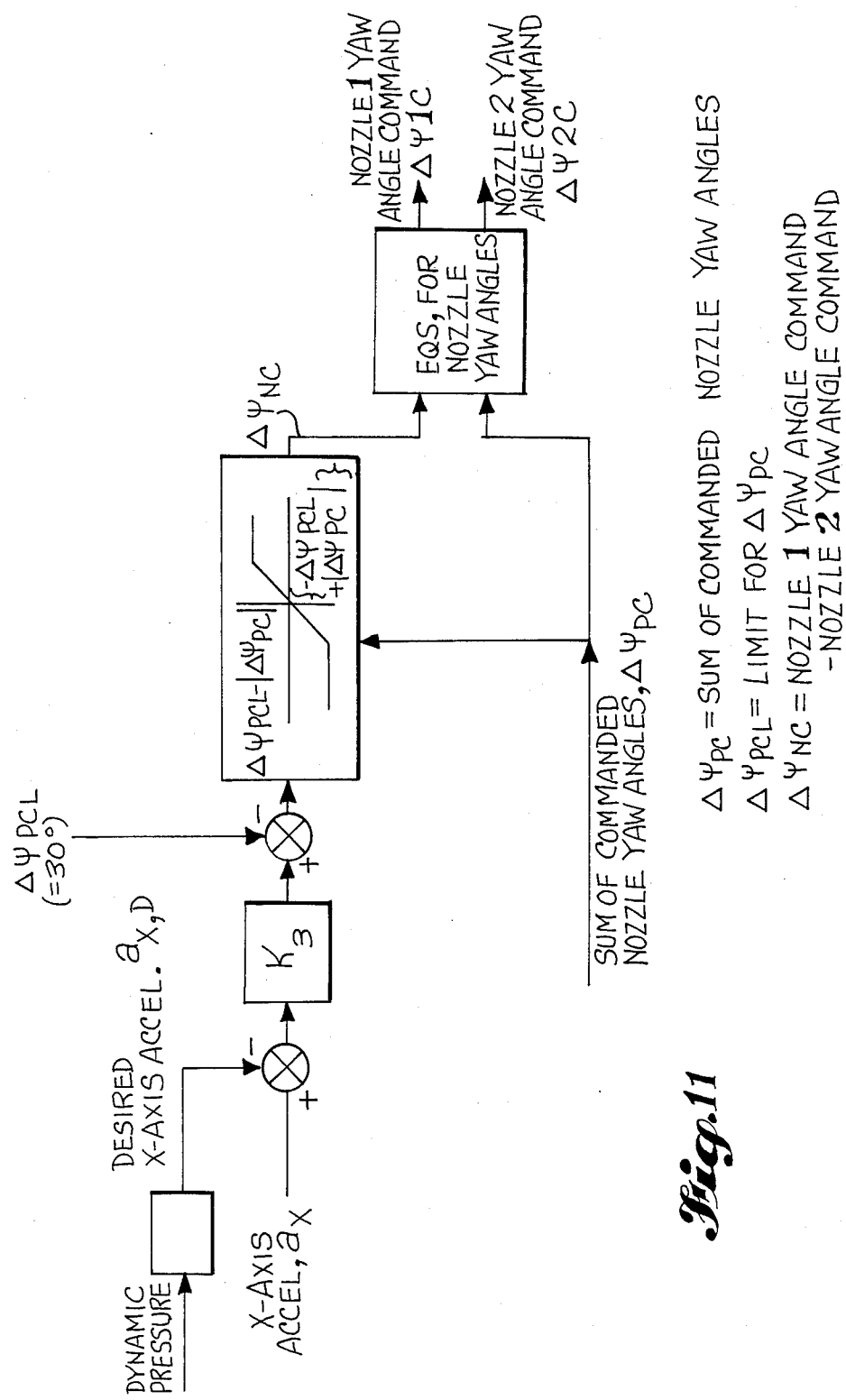
FIG. 11 is a schematic block diagram showing control logic for commanding the yaw angles for the main thrusters.

The various logic blocks shown in FIG. 6, within area 182, are illustrated in greater detail in FIGS. 7–11. FIG. 7 illustrates the preferred logic for generating desired or commanded angular rates which make up the logic block 142 in FIG. 6. FIG. 8 shows the preferred logic for seat attitude control as provided by the inner loop control logic block 166 in FIG. 6. FIG. 9 further illustrates the preferred pitching moment logic for the main thrusters 16, 18 as provided by the inner loop control logic 166. This was schematically indicated at 184 in FIG. 6, for example. FIG. 10 illustrates the preferred control logic for commanding main thruster nozzle pitch angles and corresponds to logic block 146 in FIG. 6. In association with the same logic block, FIG. 11 illustrates preferred control logic for commanding main thruster nozzle yaw angles.

The various data inputs and outputs for the control logic shown in FIGS. 7–11 would be familiar to a person skilled in the art and could be ascertained from the various legends used in FIGS. 7–11, and from the corresponding computer program listing which is submitted herewith as a part of this specification. Various portions of the listing reference various logic blocks in FIG. 6 and FIGS. 7–11. The program was set up using an EASY5 (trademark) general purpose program which is described in "Analysis of Ejection Seat Stability Using EASY Program," Volume 1, (United States Air Force Doc. No. AFWAL-TR-80-3014), September, 1980.

Both acceleration and attitude rates are controlled by making desired propulsive forces and moments appropriate functions of the errors in seat acceleration and attitude rates. The amounts or values of the errors include proportional plus integral terms that are generally defined by the below equations:

Proportional term = $K_1 \cdot$ (error)

Integral term = $K_2 \cdot \int$ (error) dt

The proportional term is used to adjust proportion system operation in an amount proportional to the amount or value of the error. The integral term is used to adjust proportion system operation an amount related to the integration of past values of the error which occur over the period of time during which actual acceleration and attitude rates do not match desired acceleration and attitude rates.

FIGS. 12–20 illustrate the effectiveness of the control law in controlling trajectory and attitude of the escape device 10. These figures show the functioning of the invention to control acceleration, attitude and altitude over a period of time for ejection of ninety-nine and one percentile crewmembers from an F-16 cockpit, during the following flight condition: 300 KEAS (knots equivalent air speed), 30° dive angle, 90° roll angle, and 70° F. propellant temperature. The results shown in these figures illustrate ejection seat behavior during free flight from the end of a catapult stroke to the end of propulsive control where a parachute is deployed. The deployment of the parachute is designated 186 in FIG. 4.

FIG. 12 shows that the maximum values of acceleration radicals are close to 1.0 which would be desired for this type of ejection situation. The acceleration radical value at time 0.0 was 0.92 due to acceleration experienced during the catapult stroke. Initially, the acceleration radical dropped because a low acceleration radical was commanded by the control logic. As the seat rotated to a more upright position, a higher acceleration radical was commanded in order to maximize the upward thrust component and thus minimize the altitude required for survival, which is critical in this type of an ejection situation.

The attitude rate responses shown in FIGS. 13–15 indicate that seat stability was accomplished in all three axes of direction. The angular rates were initially large for a short period of time in order to quickly position the seat for maximizing the thrust component in a vertical direction. However, all rates were well below those attitude rate limits which are known to be safe. These attitude rate limits are 1260, 1260 and 2521 degrees/second for roll, pitch and yaw rates, respectively.

The attitude time histories illustrated in FIGS. 16–18 illustrate that the ejection seat was promptly and smoothly rotated into the desired orientation. For example, a typical desired orientation would be 0° for the roll angle (FIG. 16), 45° for the pitch angle (FIG. 17), and a yaw angle (FIG. 18) which points the ejection seat into the wind. FIG. 19 shows that the side slip angles were kept low in effectively approaching zero in the steady state position due to the direct regulation of side slip error by the control logic. FIG. 20 illustrates the vertical trajectory of the ejection seat after separation from the aircraft. Including thirty-seven feet of altitude loss during catapult stroke, the altitudes required for survival were approximately sixty feet plus thirty-seven feet, or a total of ninety-seven feet, for the first percentile crewmember. They were seventy-four feet, plus thirty-seven feet, or a total of one hundred eleven feet for the ninety-ninth percentile crewmember.

As previously indicated, the survival of a crewmember 12 in high life-threatening ejections may dictate that the crewmember 12 is subjected to acceleration levels, at which there is a high probability of crewmember 12 incurring major injuries. However, in general, these acceleration levels should be kept low to avoid injuries, whenever doing so doesn't increase the threat to the crewmember's life.

The high life-threatening situations may also dictate taking out extra margins of safety in other areas. For example, normally the seat catapult 98, 104 and 100, 106 should be ignited only after it is ensured that the canopy 78 has opened completely and the crewmember 12 has been hauled all the way aft to seat back by the restraint system 82. This gives an extra margin of safety, because there is already a time lag between the catapult ignition and the initial catapult motion. However, providing this extra margin of safety in a low altitude, high sink rate conditions is undesirable, because it increases the altitude lost between the time of pulling the ejection handle and the time of the seat clearing the cockpit. A good compromise is to select the catapult waiting time for the high life threat conditions so that it is as low as possible, and yet it provides a high probability that the ejection seat 10 will not hit the canopy 78 and that the crewmember 12 is positioned properly for ejection. Also, the maximum crewmember acceleration limits may be kept at medium risk values to minimize injuries, until the crewmember 12 is verified to be positioned properly for ejection.

A good means of assessing the seriousness of a life-threatening situation is thus required, so that a crewmember 12 may be subjected to some risk of sustaining injuries if it is essential to do so to enable him to survive, but not otherwise.

As previously indicated, a detailed consideration of the various alternatives available for quantifying the life-threat assessment showed that a good measure of the degree of the life threat is the critical time $t_c$ which is defined as follows:

$$t_c = \frac{h_g}{v_s} - \frac{|\phi|}{K}$$

Where:
$h_g$ = seat altitude above ground, ft
$v_s$ = seat sink rate, ft/sec
$\phi$ = seat roll angle, deg, with range from $-180$ deg to 180 deg.

K = average expected value of seat roll rate during seat roll angle correction, deg/sec. It is typically equal to 360 deg/sec.

The critical time $t_c$ is thus approximately equal to that available while providing upward thrust to the seat before it will hit the ground, if it continued to descend at the current sink rate. For a seat roll angle equal to zero, the critical time $t_c$ is equal to the time at which the seat will hit the ground, if it continued to descend at the current sink rate. For seat roll angles other than zero, the critical time $t_c$ is decreased by an amount proportional to the absolute value of the roll angle. This decrease in $t_c$ is required to compensate for the time lost in rolling the seat to an attitude, where propulsive thrust can be used most effectively.

As an example, if at ejection initiation, the seat is seventy-five feet above the ground, the seat sink rate is 250 feet per second, and the seat roll angle is zero, then the value of $t_c$ is 0.3. For the same values of the seat altitude above ground and the seat sink rate, but with the seat roll angle equal to 90°, the value $t_c$ is reduced to 0.05. For a similar condition with a higher roll angle, the value of $t_c$ may be negative.

In the particular seat design that was investigated, a value of $t_c$ of about 0.3 or less corresponds to a high degree of life threat. Higher values of $t_c$ correspond to lower degrees of life threat. A negative value of $t_c$, or a value of $t_c$ significantly less than 0.3, implies that the ejection may not be survivable, even though the life-threat assessment logic will work to turn the seat away from the ground as hard as it can.

The sensor 120 may be a continuously operating strap-down Inertial Sensor Unit (ISU). Sensor 132 may be an aircraft-mounted radar altimeter. The ISU provides values of the seat sink rate and seat roll angles at all times. These data are, therefore, available at ejection initiation and every 10 ms (controller frame time) thereafter. The aircraft-mounted radar altimeter transmitter is planned to be used only after ejection initiation. A current state-of-the-art frequency-modulated continuous wave (FM-CW) radar altimeter, can provide the "altitude above ground" information in about six ms. The microprocessor will, therefore, have all the data required for life-threat assessment at 10 ms after ejection initiation. The life-threat assessment is performed during the next 10 ms, so that appropriate control commands can be issued within 20 ms after ejection initiation.

Figure 21:
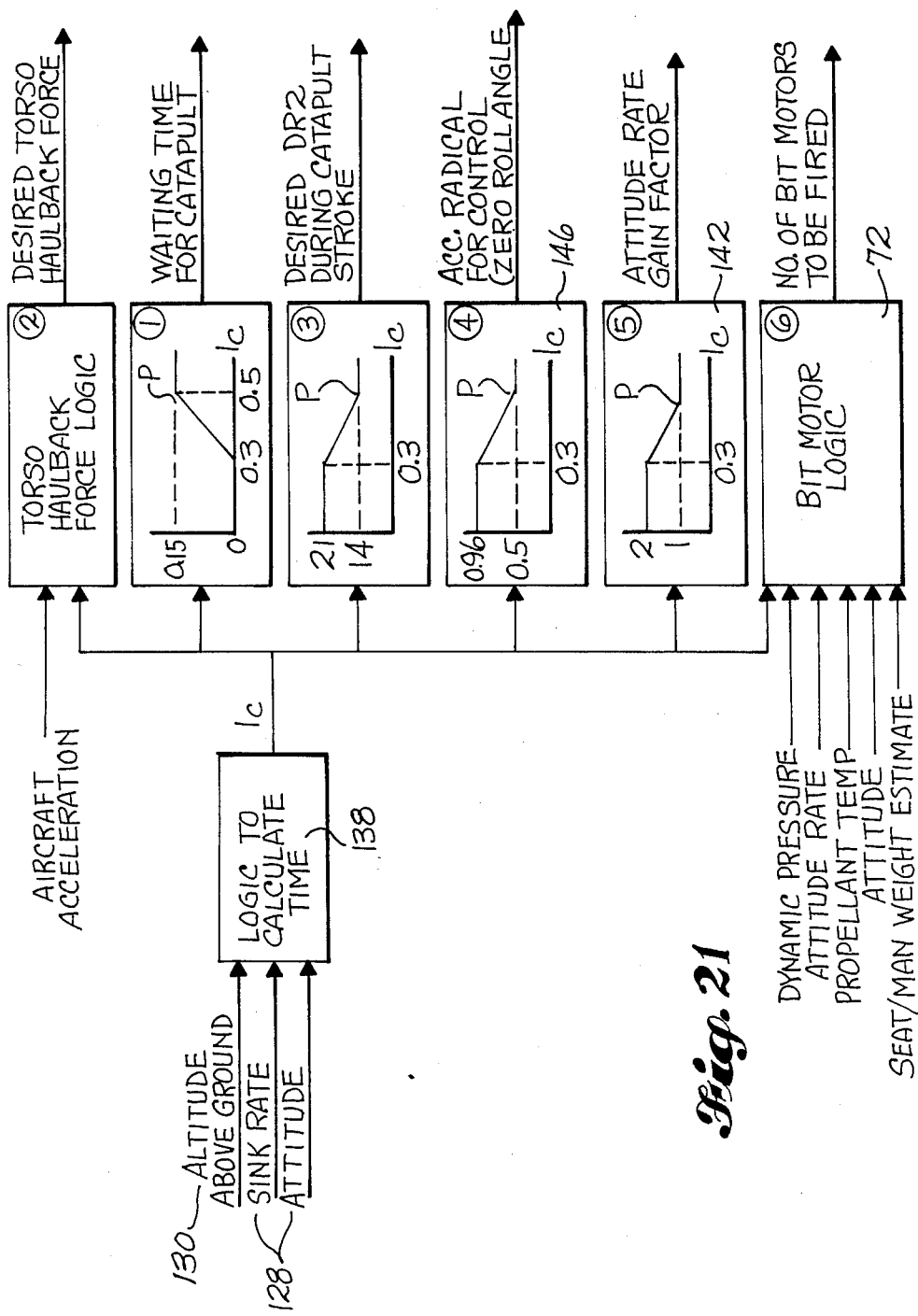
FIG. 21 is a summary block diagram, showing a relationship of the life-threat assessment and control command logic to the control logic for the haul back force, the waiting time for the catapult, the desired DRZ (Dynamic Response along Z-axis) during catapult stroke, the acceleration radical, the attitude rate gain and the number of bit motors to be fired.

FIG. 21 shows the relationships between the life-threat assessment measurement, $t_c$ and the various control commands for the seat or other escape device 10. The current values of various parameters are also shown, by way of example. It is expected that these values will be refined as the overall system design is further developed.

In each of the blocks 1 and 3–5, the $t_c$ value labeled P is a predetermined value above which the risk of injury to the crewmember is relatively low. The blocks 1 and 3–5 show changes in the control commands which are made as $t_c$ decreases from the predetermined value P. Each of these blocks show that the changes are gradual until $t_c$ reaches the value which indicates a high life-threat situation, e.g. 0.3. When $t_c$ is larger than the predetermined time value P, the function being controlled is controlled in a manner subjecting the crewmember to a relatively low injury risk level. When $t_c$ is smaller than the predetermined value P, the function being performed is controlled so that it will occur faster, attended by the crewmember being subjected to a higher injury risk level. The change in the control is gradual until the high life-threat value of $t_c$ is reached. This is done so that the crewmember is not subjected to an injury risk level higher than necessary for survival.

Block 1 in FIG. 21 shows a typical relationship for the waiting time for the catapult. No waiting time (or only a small waiting time) will be allowed for high life-threat situations, that is, for values of $t_c$ of 0.3 or less. Thus, some risk is taken that the ejection seat will hit the canopy, if the canopy does not open as fast as designed, or that the crewmember 12 will not be in the proper position for ejection, if he has to be hauled back over a longer-than-average distance, or against high g loads. It should be noted that even for high life-threat conditions, the risk taken should be a reasonable risk. The minimum waiting time for catapult must be such that there is a high probability that the ejection seat will not hit the canopy and the crewmember is positioned properly for ejection.

In order to keep the waiting time for the catapult initiation at a low value, the torso haul back force itself will be made a function of the life-threat assessment measure $t_c$ as indicated by block 2 in FIG. 21. The maximum torso haul back force will be 300 pounds for high values of $t_c$ and 1 g (or less) aircraft acceleration. However, it will be allowed to increase to 520 pounds for low values of $t_c$ or high aircraft acceleration.

The maximum crewmember acceleration limits can be specified in terms of Dynamic Response along each major axis. For exposure to accelerations in more than one axis, an acceleration radical calculated from the Dynamic Response in the three axes by the following equation is required to be less than one:

Acceleration Radical =

$$\left[\left(\frac{DRX(t)}{DRX_L}\right)^2 + \left(\frac{DRY(t)}{DRY_L}\right)^2 + \left(\frac{DRZ(t)}{DRZ_L}\right)^2\right]^{\frac{1}{2}}$$

where:
DRX, DRY, DRZ are the Dynamic Responses calculated from accelerations at the critical point along the X, Y, and Z axes respectively (FIG. 2),
t is time, and
subscript L denotes the limiting value for the assigned risk value.

During the catapult stroke, DRZ is to be limited to 22.8 for high risk, 18.0 for medium risk and 15.2 for low risk ejection conditions. This requirement is satisfied by using the continuous relationship indicated in block 3 of FIG. 21, for the desired value of DRZ during catapult stroke. For low values of $t_c$ corresponding to high life threat, DRZ is controlled to 21.0 to ensure that the limit of 22.8 is satisfied in spite of small overshoots above the controlled value. Similarly, for larger values of $t_c$ corresponding to low life threat, DRZ is controlled to 14.0 to ensure that the limit of 15.2 is not violated. For intermediate values of $t_c$, the continuous relationship of the controlled value of DRZ allows the DRZ maximum values to be significantly less than the three values set forth above for the high, medium and low risk conditions.

As previously indicated, the acceleration radical is calculated on the basis of high risk values only. During ejected flight, it is controlled to 0.95 for small values of $t_c$ and 0.50 for large values of $t_c$ as indicated by the relationship in block 4 of FIG. 21. The acceleration limits in the three axes for the low risk conditions are 0.6 or less times the corresponding acceleration limits for high risk. Therefore, if the acceleration radical based upon high risk limits is less than 0.6, then the acceleration radical based upon the low risk limits will always be less than 1.0.

The attitude rates affect the acceleration levels at the extremities of a crewperson and thus should also not be unnecessarily high. As shown by the typical relationship in block 5 of FIG. 1, the attitude rate gain factor (which is proportional to the commanded attitude rates) has a higher value for higher life-threat conditions.

The desired seat attitude rates are achieved by controlling these directly in the control law (FIG. 6). The maximum attitude rates for all simulated ejection conditions have been less than 60% of the attitude rate limits. The maximum attitude rates for high life-threat conditions have been less than 720 deg/sec, compared with the limits 1260, 1260 and 2521 deg/sec for roll, pitch and yaw, respectively.

Factors such as the dynamic pressure, seat attitude rate, propellant temperature, and seat/crewmember weight do not effect the life-threat assessment directly. However, in combination with the life-threat assessment, these are used to govern the amount of propulsive force to be employed, as indicated by block 6 of FIG. 1. For the rocket motor propulsion system used on the seat design that has been investigated, the amount of propulsive force is represented by the number of bit motors to be ignited.

It is to be appreciated that the method and system described above could be altered somewhat without departing from the spirit and scope of the invention. In accordance with established patent law, the system that has been illustrated and described is not to be used for defining the invention to be protected. Rather, the limits of protection are specified by the appended claims. These claims are to be interpreted in accordance with established rules of claim interpretation, including use of the doctrine of equivalents.

What is claimed is:
1. A method of effecting crewmember escape from a flying vehicle, comprising:
providing the vehicle with an escape device which can be separated from the vehicle;
positioning the crewmember in said escape device; and
separating the crewmember and the escape device from the vehicle when it is desired to effect an escape, including:
at the start of separation sensing the altitude above ground of the escape device, the sink rate of the escape device and the roll angle of the escape device;
dividing the altitude above ground by the sink rate to obtain a first time value which increases with an increase in altitude above ground and decreases with an increase in sink rate;
dividing the roll angle by a desired rate of roll angle correction to obtain a second time value which increases with roll angle and decreases with the desired rate of roll angle correction;
subtracting the second time value from the first time value to obtain a third time value; and
in response to the third time value being larger than a predetermined time value, controlling the escape to subject the crewmember to a relatively low injury risk level, and in response to the third time value being smaller than said predetermined time value, controlling the escape to occur faster, attended by the crewmember being subjected to a higher injury risk level.

2. A method according to claim 1, including:
providing the vehicle with a removable barrier in the escape path of the escape device, and means for causing removal of the barrier which takes an interval of time to function, and ejection means for ejecting the escape device from the vehicle which also takes an interval of time to function, and
in response to the third time value being larger than a predetermined time value, initiating the ejection means after removal of the barrier, and
in response to the third time value being smaller than said predetermined time value, initiating the ejection means before the barrier is removed, but while the means for removing the barrier is functioning.

3. A method according to claim 1, including:
providing the escape device with a torso haul back means which functions to apply a torso haul back force on the crewmember, for the purpose of moving him into restrained contact with the escape device, and
in response to the third time value being larger than a predetermined time value, operating said torso haul back means to apply a first torso haul back force on the crewmember, and
in response to the third time value being smaller than the predetermined time value, applying a larger torso haul back force on the crewmember.

4. A method according to claim 3, including:
providing the vehicle with a removable barrier in the escape path of the escape device, and means for causing removal of the barrier takes an interval of time to function, and ejection means for ejecting the escape device from the vehicle which also takes an interval of time to function, and
in response to the third time value being larger than a predetermined time value, initiating the ejection means after removal of the barrier, and
in response to the third time value being smaller than said predetermined time value, initiating the ejection means before the barrier is removed, but while the means for removing the barrier is still functioning.

5. A method according to claim 1, including:
providing an ejection means for ejecting the escape device from the vehicle, and
in response to the third time value being larger than a predetermined time value, controlling the ejection means to limit the acceleration of the crewmember during ejection to a level minimizing injury risk to the crewmember, and
in response to the third time value being smaller than said predetermined time value, controlling the ejection means to cause a faster ejection, attended by an increase in the acceleration level and an increase in the injury risk to the crewmember.

6. A method according to claim 1, including:
providing the escape device with a parachute and with thruster means operable for flying the escape device, following its separation from the vehicle, into a position for safe parachute deployment, and
in response to said third time value being larger than a predetermined time value, controlling the thruster means to position the escape device at a rate of acceleration which will subject the crewmember to a relatively low risk of injury, and
in response to the third time value being smaller than the predetermined time value, controlling the thruster means to accelerate positioning of the escape device, attended by an increase in the risk of injury to the crewmember.

7. A method according to claim 1, including:
providing the escape device with a parachute and with thruster means comprising both attitude correcting thruster means and altitude gaining thruster means, together operable for flying the escape device, following its separation from the vehicle, into a position for safe deployment of the parachute, and
in response to said third time value being larger than a predetermined time value, controlling the thruster means to so position the escape device at a rate of acceleration which will subject the crewmember to a relatively low risk of injury, and
in response to said third time value being smaller than the predetermined time value, controlling the thruster means to accelerate the positioning of the escape device, attended by an increase in the risk of injury to the crewmember.

8. A method according to claim 1, including:
providing the escape device with a parachute and with main thruster means, operable for propelling the escape device upwardly to where the parachute can be safely deployed, and attitude controlling thruster means operable for moving the escape device into a position directing the main thruster means generally downwardly, and
in response to said third time value being larger than a predetermined time value, controlling the attitude controlling thruster means for positioning the escape device at a rate of acceleration to the crewmember, causing a relatively low risk of injury, and
in response to the third time value being smaller than the predetermined time value, controlling the attitude controlling thruster means to accelerate positioning of the escape device, attended by an increase in the risk of injury to the crewmember.

9. A method of effecting crewmember escape from a flying vehicle, comprising:
providing the vehicle with an escape device which can be separated from the vehicle;
positioning the crew member in said escape device;
providing ejection means for ejecting the escape device from the vehicle;
providing the escape device with thruster means, operable for flying the escape device following its separation from the vehicle;
providing parachute means;
initiating operation of the ejection means for ejecting the escape device, and the crewmember therein, from the vehicle when it is desired to effect an escape;
at the start of ejection, determining the altitude of the escape device, the sink rate of the escape device and the roll angle of the escape device;
dividing the altitude above ground by the sink rate to obtain a first time value which increases with an increase in altitude above ground and decreases with an increase in sink rate;
dividing the roll angle by a desired rate of roll angle correction to obtain a second time value which increases with roll angle and decreases with the desired rate of roll angle correction;

subtracting the second time value from the first time value to obtain a third time value; and in response to the third time value being larger than a predetermined time value, controlling the ejection means to eject the escape device from the vehicle at a rate of acceleration which subjects the crewmember to a relatively low risk of injury, and in response to the third time value being smaller than said predetermined time value, controlling the injection means to accelerate ejection of the escape device from the vehicle, attended by a higher injury risk level to the crew member.

10. A method according to claim 9, including:

controlling the thruster means following ejection of the escape device from the vehicle, for flying the escape device into a position where the parachute can be safely deployed, and in response to the third time value being larger than a predetermined time value, controlling the thruster means to so position the escape device at a rate of acceleration which subjects the crewmember to a low risk of injury, and in response to the third time value being smaller than the predetermined time value, controlling the thruster means to accelerate positioning of the escape device, attended by an increase in the risk of injury to the crewmember.

11. A method according to claim 9, including:

providing the vehicle with a removable barrier in the escape path of the escape device, and means for causing removal of the barrier which takes an interval of time to function, and in response to the third time value being larger than a predetermined time value, initiating the ejection means after removal of the barrier, and in response to the third time value being smaller than said predetermined time value, initiating the ejection means before removal of the barrier, but while the means for removing the barrier is functioning and at a time which will result in the barrier being removed when the escape device is ejected.

12. A method according to claim 9, including:

providing the escape device with a torso haul back means which functions to apply a torso haul back force on the crewmember, for the purpose of moving him into restrained contact with the escape device, and in response to the third time value being larger than a predetermined time value, operating said torso haul back means to apply a first torso haul back force on the crewmember, and in response to the third time value being smaller than the predetermined time value, applying a larger torso haul back force on the crewmember.

13. A method according to claim 12, including:

providing the vehicle with a removable barrier in the escape path of the escape device, and means for causing removal of the barrier which takes an interval of time to function, and in response to the third time value being larger than a predetermined time value, initiating the ejection means after removal of the barrier, and in response to the third time value being smaller than said predetermined time value, initiating the ejection means before removal of the barrier, but while the means for removing the barrier is functioning and at a time resulting in the barrier being removed when the escape device is ejected.

14. A crewmember escape system for a flying vehicle, comprising:

an escape device which can be separated from the flying vehicle, and in which the crewmember is positioned;

a parachute for the crewmember;

means for separating the escape device and the crewmember therein from the vehicle when it is desired to effect an escape, including:

ejection means for ejecting the escape device from the vehicle;

thruster means on the escape device, for flying the escape device following ejection, into a position for safe deployment of the parachute;

control means for the ejection means and the thruster means, including a microprocessor carried by the escape device;

sensor means for at the start of separation determining the altitude of the escape device and sending an altitude signal to the microprocessor;

sensor means for at the start of separation determining the sink rate of the escape device and sending a sink rate signal to the microprocessor;

sensor means for at the start of separation determining the roll angle of the escape device and sending a roll angle signal to the microprocessor;

said microprocessor including program means for dividing the altitude by the sink rate to obtain a first time value which increases with an increase in altitude above ground and decreases with an increase in sink rate, for dividing the roll angle by a desired rate of roll angle correction to obtain a second time value which increases with roll angle and decreases with the desired rate of roll angle correction, and for subtracting the second time value from the first time value to obtain a third time value; and said microprocessor including program means for controlling the ejection means and the thruster means, said program means for controlling, in response to the third time value being larger than a predetermined time value, controlling the rate of acceleration of the escape device during ejection and flying to a level that will subject the crewmember to a relatively low risk of injury, and in response to the third time value being smaller than said predetermined time value, controlling ejection and flying of the escape device and crewmember into a position for safe deployment of the parachute so that they occur at a faster rate of acceleration, attended by a greater risk of injury to the crewmember.

15. A crewmember escape system according to claim 14, wherein the thruster means on the escape device comprises directional thrusters for uprighting the escape device following ejection, and main thrusters for propelling the escape device upwardly, wherein said system includes propulsion gas generating means, and wherein the program means for controlling the thruster means controls the propulsion gas generating means and the delivery of the propulsion gases to the directional thrusters and the main thrusters.

16. A crewmember escape system for a flying vehicle, comprising:

an escape device which can be separated from the flying vehicle, and in which the crewmember is positioned;

means for separating the escape device and the crewmember therein from the vehicle when it is desired to effect an escape, including:

ejection means for ejecting the escape device from the vehicle;

thruster means on the escape device, for flying the escape device following ejection, for positioning it to move upwardly and moving it upwardly;

control means for the ejection means and the thruster means, including a microprocessor carried by the escape device;

sensor means for at the start of separation determining the altitude above ground of the escape device and sending an altitude above ground signal to the microprocessor;

sensor means for at the start of separation determining the sink rate of the escape device and sending a sink rate signal to the microprocessor;

sensor means for at the start of separation determining the roll angle of the escape device and sending a roll angle signal to the microprocessor;

said microprocessor including program means for dividing the altitude above ground by the sink rate to obtain a first time value which increases with an increase in altitude above ground and decreases with an increase in sink rate, for dividing the roll angle by desired rate of roll angle correction to obtain a second time value which increases with roll angle and decreases with the desired rate of roll angle correction, and for subtracting the second time value from the first time value to obtain a third time value, $t_c$; and said microprocesser including program means for controlling the ejection means and the thruster means, said program means for controlling, in response to $t_c$ being larger than a predetermined time value, controlling at least one phase of operation of the escape device in a way subjecting the crewmember to a relatively low risk of injury, and in response to $t_c$ being smaller than said predetermined value, controlling such phase of operation of the escape device so that it happens faster, attended by an increase in the risk of injury to the crewmember.

17. A crewmember escape system according to claim 16, wherein the phase of operation of the escape device involves the timing of start of separation of the escape device from the vehicle, and wherein the escape device includes haul back means for hauling the crewmember back into a secure position against a support, and wherein said program means for controlling in response to $t_c$ being larger than the predetermined value, delays the start of separation of the escape device from the vehicle until the haul back means has substantially functioned to move the crewmember into said secure position, but in response to $t_c$ being smaller than the predetermined value, the program means for controlling functions to start separation of the escape device from the vehicle before the haul back means has finished hauling the crewmember back into the secure position.

18. A crewmember escape system according to claim 16, wherein the phase of operation of the escape device is the timing of the separation device from the vehicle, wherein the vehicle includes a barrier in the escape path of the escape device which much be removed, and which includes means for effecting its removal which requires a predetermined interval of time to function, and said program means for controlling functions in response to $t_c$ being larger than the predetermined value to delay the start of separation of the escape device until after the removal means for the barrier has functioned to remove the barrier from the escape path, but in response to $t_c$ being smaller than the predetermined value, starting the separation of the escape device from the vehicle before the removal means has functioned to completely remove the barrier from the escape path.

19. A crewmember escape system according to claim 16, including ejection means for ejecting the escape device from the vehicle, and the phase of operation is the control of acceleration rate on the crewmember during ejection, wherein the program means for controlling functions to, in response to $t_c$ being larger than a predetermined value, limiting the acceleration on the crewmember during ejection to a level subjecting the crewmember to a relatively low risk of injury, and in response to $t_c$ being smaller than a predetermined value, making ejection occur faster, attended by an increase in the acceleration level on the crewmember and an increased risk of injury.

20. A crewmember escape system according to claim 16, wherein the phase of operation is the orientation of the escape device to start it moving upwardly, following its separation from the vehicle, and wherein the program means for controlling functions, in response to $t_c$ being larger than the predetermined value, to rotate the escape device at a rate of angular movement subjecting the crewmember to a low risk of injury, but in response to $t_c$ being smaller than the predetermined value, rotating the escape device at a faster rate, attended by an increased risk of injury to the crewmember.

21. A crewmember escape system according to claim 16, wherein the phase of operation is the flying of the escape device following ejection, and wherein the program means for controlling functions, in response to $t_c$ being larger than a predetermined value, to fly the escape device in a manner subjecting the crewmember to a low risk of injury, but in response to $t_c$ being smaller than the predetermined value, flying the escape device to start it moving upwardly, at a faster acceleration initially, attended by an increased risk of injury to the crewmember.

* * * * *